(12) United States Patent
Kadrnoska et al.

(10) Patent No.: US 7,041,912 B2
(45) Date of Patent: May 9, 2006

(54) INSTALLATION AND COVER DEVICE FOR CABLES AND METHODS FOR INSTALLATION THEREOF

(75) Inventors: Helmut Kadrnoska, Vienna (AT); Gerhard Reiss, Laxenburg (AT); Alfons Fietz, St. Christophen (AT)

(73) Assignee: Wien Kanal-Abwassertechnologie GesMbH, Vienna (AT)

( * ) Notice: Subject to any disclaimer, the term of this patent is extended or adjusted under 35 U.S.C. 154(b) by 0 days.

(21) Appl. No.: 10/496,197

(22) PCT Filed: Sep. 26, 2002

(86) PCT No.: PCT/AT02/00281

§ 371 (c)(1),
(2), (4) Date: May 28, 2004

(87) PCT Pub. No.: WO03/044919

PCT Pub. Date: May 30, 2003

(65) Prior Publication Data

US 2004/0258385 A1    Dec. 23, 2004

(30) Foreign Application Priority Data

Nov. 20, 2001  (AT) .............................. A 1828/2001

(51) Int. Cl.
*H02G 3/00* (2006.01)

(52) U.S. Cl. .................... 174/154; 174/138 G; 174/66; 174/67; 174/68.3

(58) Field of Classification Search ................ 174/154, 174/138 G, 66, 67, 68.3

See application file for complete search history.

(56) References Cited

U.S. PATENT DOCUMENTS

| 2,438,143 | A | * | 3/1948 | Brown ...................... 191/12 R |
| 2,746,112 | A | * | 5/1956 | Simon ...................... 24/129 B |
| 3,996,500 | A | * | 12/1976 | Coules ...................... 361/748 |
| 4,647,251 | A | | 3/1987 | Gale |
| 6,107,575 | A | | 8/2000 | Miranda |
| 6,332,479 | B1 | * | 12/2001 | Ko ............................ 138/156 |
| 6,476,323 | B1 | * | 11/2002 | Beebe et al. .............. 174/72 A |

FOREIGN PATENT DOCUMENTS

| DE | 297 03 480 U1 | 8/1998 |
| EP | 0 696 097 A1 | 2/1996 |
| EP | 0 855 773 A1 | 7/1998 |

* cited by examiner

*Primary Examiner*—Jinhee Lee
(74) *Attorney, Agent, or Firm*—Laurence A. Greenberg; Werner H. Stemer; Ralph E. Locher

(57) ABSTRACT

The present invention relates to an installation device for cables (6) that are to be laid along walls, with cable holders (5) and a cover (10). The present invention makes provision such that
the cover (10) is configured as a cable cover profile strip (1) with a front cover strip (2) and side cover strips (3) that extend from its two side edges (201), which can be wound on to a winding body and then unwound from same in order to be installed;
the two side cover strips (3) are connected to the front cover strip (2) through a folding or hinged connection;
in the wound-on state (LT), the two side cover strips are folded inward with their unattached side edges (301) facing each other, and extending in the same direction as the front cover strip (2); and
in that each of the two side cover strips (3) can be moved into the installation position (MA) by being folded away from the front cover strip (2), transversely to the longitudinal dimension of said front cover strip (2).

45 Claims, 3 Drawing Sheets

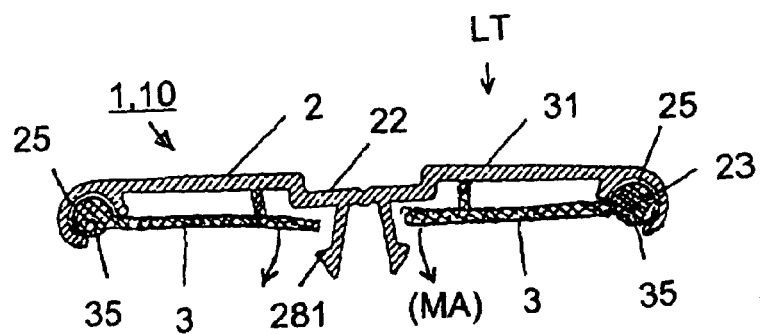
FIG. 5
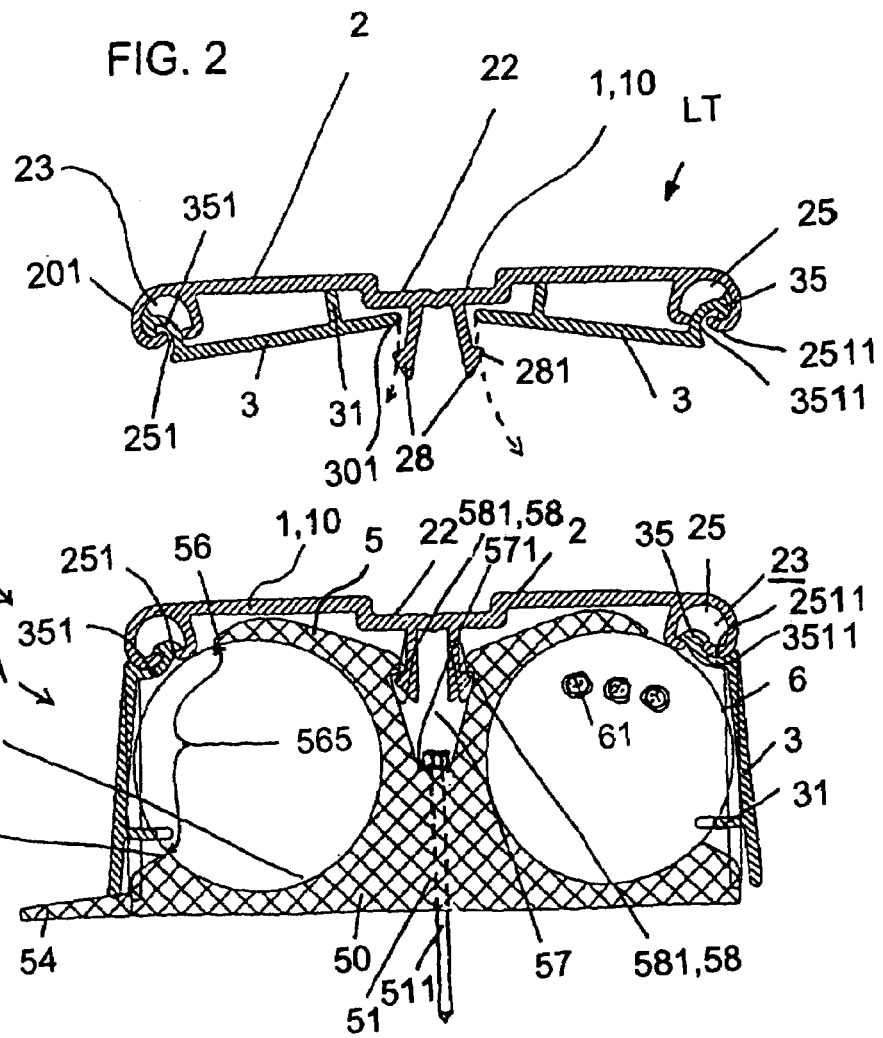
FIG. 2
FIG. 1

INSTALLATION AND COVER DEVICE FOR CABLES AND METHODS FOR INSTALLATION THEREOF

BACKGROUND OF THE INVENTION

Field of the Invention

The present invention relates to a new installation and cover device for cables or cable sets for telephone lines, data-transmission lines, electrical cables, and the like, in particular glass fiber or fiber optics cables or cable sets that are to be laid along walls, partitions, ceilings and the like, in particular underground pipes, arches, tunnels, sewers, or shafts, with cable holders that are spaced apart on said walls or partitions, ceilings, or the like, and with a cover that can be attached on or to the same, and which essentially encloses the cable or cable set.

In recent years, the great rate of growth in the area of information technology and telecommunications, as well as ever increasing demands for energy, have necessitated the large-scale expansion of transmission lines and cables for the most varied types, and their interconnection.

To a large extent, laying the lines or cables for the purposes set out above, even in areas with few obstacles to construction, is no longer done with overhead lines that are vulnerable to damage caused by the weather but rather, whenever possible, with underground lines; even though the excavation that this entails is relatively costly, such lines are not disrupted by other infrastructure, buildings, ground installations or the like.

It was, and is, much more difficult to lay lines of this kind beneath the surface in densely populated urban areas, when disruption of traffic flows is the only serious disadvantage that must be taken into consideration.

Optical fiber or glass fiber cable are significant factors when constructing cable systems and data networks having high transmission densities and rates, and several years ago a start was made to avoid, as far as possible, the excavation and construction operations needed to install such cables and to use existing underground infrastructure for utilities and waste-disposal networks, in particular sewer networks, for their installation. In the mean time, not only data-transmission, control, and information-bearing cables, but also high-voltage lines, are being laid in underground sewer networks in various major cities.

The major advantage of this relatively new kind of installation is the fact that it is no longer necessary to break open the ground, with the concomitant destruction of essential road surface areas and pavement, and the significant disruption of pedestrian and vehicular traffic, in order to lay a cable or cable sets, with all their undesirable consequences; this results in considerable cost savings despite relatively higher flexibility with respect to the section that is to be installed.

It goes without saying that one important requirement remains; namely, that the installation technology in the underground utilities and disposal systems entails the lowest possible cost and that rapid installation is possible under the difficult conditions that prevail in sewer networks.

The technique for laying cables and cable sets that has been customary up to now is, in essence, to attach cable holders with tray or dish-like receptacles for holding or clamping the cable that is to be installed to the walls of a structure, e.g., a tunnel or a channel, at intervals of one or two meters and then to attach cable cover plates, shrouds or the like that are of essentially rigid material, e.g., plastic with or without glass-fiber reinforcement, and then secure the cable on these cable holders laterally on both sides and to the front. In order to make it simpler to attach these cable covers to the particular underground installation site, and to make it easier to handle them, these cable covers were of a relatively short installed length, so that a large number of such cable cover plates had to be secured to the cable holders that were installed at intervals that had to be maintained relatively precisely on the particular wall, ceiling or the like in order to install longer cable covers. In addition to this, there is the fact that for all practical purposes, at each cable holder or at each second cable holder one cover plate butts up against the next cover plate, so that a large number of butt joints has to be accepted, together with the associated risk of contamination.

SUMMARY OF THE INVENTION

It is the objective of the present invention to create a new type of a cover system for cables that are installed on walls, ceilings or the like, in particular of underground structures, such as sewer systems, with cable holders that hold the cables or cable sets and a cover that is to be installed on these and encloses the cables or cable sets that have been installed. The new cable cover is to be characterized in that the handling outlay required for installing it is low and, at the same time, the problems addressed heretofore with respect to the large number of butt joints that have to be secured against loosening and the danger of contamination of these butt joints between the individual cover plates that adjoin each other is minimized.

The object of the present invention is an installation and cover device of the type described in the introduction hereto, the essential features of which are:

that the covering is embodied as a cable cover profile strip that can be wound or coiled onto a winding body, in particular a drum, coil, roll, or roller, and unwound from said winding body for installation thereof, and comprising a front cover strip and side cover strips that extend from both side edges thereof;

that the two side cover strips are connected to the front cover strip through a folding or jointed connection, preferably through a hinged connection;

that the two side cover strips of the cable cover profile strip, when rolled up for storage and transportation, has its two unattached side strips folded in on each other and extending in the same direction as the front cover strip or essentially parallel to the same, and that for attaching the profile strip 1 that forms the cable cover to the cable holder as well as for the enclosing covering of cable or cable set that is held by this, each of the two side cover strips can be brought into the installation and covering position by being folded or pivoted away from the front cover strip transversely or essentially perpendicular to said front cover strip.

For the first time ever, the present invention provides a type of endless cable installation and covering system that requires significantly less outlay for production, transportation, logistics, and handling.

The advantage of the present invention is that it uses a cable cover profile strip that possesses a certain material strength, although it is in principle only two-dimensional, instead of a large number of cover plates or shrouds that are three dimensional and have a C-cross section and that therefore take up a great deal of space when transported or moved, and have to be manipulated individually on site.

One result of the present invention is that it is now only necessary to move a continuous cable cover profile strip that is wound on to an appropriate drum to the installation site, for example, to an access point to a sewer system, wind the new type of cover strip off the drum, and then draw it out as far as the particular installation site in the sewer system—which gets closer to the access opening in the course of the installation work—where the side cover strips are best folded or pivoted continuously away from the front cover strip into the ultimately three dimensional end or installation form, which similarly has a cross section that is more or less that of a square bracket ([). The intended surrounding enclosure of the cable that is laid is effected with the "continuous" cover shroud that is configured in this way, while the continuous cable cover is fixed on the cable holders that are spaced apart from one another.

At this point, it should be mentioned that a continuous strip-type cable cover in which there are hinges between the cover strips, is particularly preferred because of its great versatility and flexibility within the framework of the present invention.

In this sense an additional, advantageous embodiment of the new installation and cover device for cables or cable sets is such that the cable cover or the profile strip that forms this is embodied with jointed connections, in particular hinged connections, between the front cover strips and the side cover strips, each such cover strips being wound separately onto its own winding body for storage and transportation, and in that just prior to or during the installation of the cover to the assembly of the cable cover profile strip that is in the assembly and cover position MA, the three cover strips can be assembled or combined to form the ensemble of the front cover strip and the side cover strips that are connected flexibly to it on both sides through hinge connections and folded away from it, in each instance transversely to the extent of the front cover strip.

In this embodiment of the present invention, with individual cover strips that are wound on to separate winding bodies, in addition to the fact that as compared to winding on a cable cover profile strip that is ready for installation, given a winding body of identical size, as described heretofore, approximately two to two and one-half times the length of the individual cover strips can be accommodated, and that combining or assembling the cover strips that were formerly separated from one another to form a finished cable cover profile strip in the framework of the manufacturing process is eliminated and the cover is applied at the installation site, which increases its versatility.

A plastic or polymermaterial is best used for the new cable cover profile strip; it should be mentioned that no significant limits are imposed on the material that is selected, long-term stability, moisture resistance, and resistance to attack by organisms, without risk of breakage, even at low temperatures, being taken into account.

Polymer plastics with characteristics and physical properties as follow are especially preferred within the framework of the present invention.

Dimensional stability (Martens) (DIN 53462) 65–70° and/or

Dimensional stability (Vicat, Method β) (DIN 53460) 75–88° .16 W/km and/or

Tensile strength (DIN 53455) 45–55 N/mm$^2$ and/or

Elongation after fracture (DIN 53455) 10–20%, Preferably 14–16%, and/or

Limiting flexural strength (DIN 52452) 80–120 N/mm$^2$, Preferably 90–110 N/mm$^2$ and/or Modulus of elasticity (DIN 53457) 2500–3500 N/m$^2$, Preferably 2800–3200 N/mm$^2$, in Particular 2950–3050 N/mm$^2$ Within the framework of exhaustive tests, plastics based on hard PVC were found to be particularly suitable and, at the same time, cost effective for laying cables and their covers.

A hinge-type connection between the front cover strip and the side cover strips can cope with the task of creating a profile strip that can be stored, transported, and wound onto a suitable winding body without any problems, and then transformed into a three-dimensional "continuous" cable cover shroud on site when the cable is laid.

During the course of development, an arrangement of hinge head and hinge groove of the hinge-type connection was found to be particularly advantageous for preventing susceptibility to contamination.

Alignment of the hinge-groove-slot opening with the wall, ceiling, or the like, or to the cable that is to be covered is similarly advantageous with respect to the danger of contamination, as discussed heretofore.

Hinge grooves, which are essentially of C-cross section are advantageous.

simple embodiment of the hinge head on each of the two side cover strips is a roller that can rotate and slide in the hinge groove.

An additional variant of the embodiment of the hinge head on each of the side cover strips, with a cross section similar to a nail head, entails the advantage of improved threading or insertion when combining the side cover strips with the front cover strip to form a cable cover strip that is ready for use. In addition, this also ensures an enlarged angle of pivot for the side cover strips to the front cover strip, as well as greater flexibility of the overall cable cover profile strip; this makes it easier to wind it on to the drum and wind it off said drum when on site or close to the installation site.

is preferred that the surfaces of the hinge head that slide on one another on the particular side cover strips and the hinge grooves on the front cover strip be cylindrical surfaces.

What applies to the shaft or neck that joins the nail-like hinge head to the side cover strips is the outward curved shape of the same, for an external shape of the new cover that is for all practical purposes free of notches or slits and thus less vulnerable to contamination.

In this sense, the adaptation of the curvature of the hinge head-neck portion and of the outer edge area of the particular hinge groove of the front cover strip is also advantageous.

matching between the cross section shape of the hinge head of the side cover strip and the hinge groove of the front cover strip, as well as between the hinge groove slot and the hinge head neck portion, which limits the amount to which the particular side cover strip can be pivoted outward is advantageous since, in this way, a kind of pretensioning is achieved when the cable that is laid is covered with the new cable cover strip that is unfolded or pivoted out into the third dimension during installation, so that it locks behind the cable and thereby ensures that the cable can be additionally held by the cable.

The stiffening strip of the side cover strips enhances the mechanical stability of the installed cable cover strip, one advantage of which that is to be stressed is its function as a kind of suspension element for the cover on the cable that has already been laid.

The front cover strip of the new cable cover profile strip may have on its front side a flat, relatively broad, groove the permits the arrangement and rapid positioning of the abutting ends of the new cover profile strips, at the junction of which they overlap, and also permits its stable fixing without the danger of the installation on the cable holders becoming loose.

Particularly preferred is a type of attachment of the new cable cover profile strip on the cable holders by way of a snap-in or detent profile on the back of the front cover strip.

The cable holder is formed with two trough-like cable-holder dishes that face each other symmetrically and are of C cross section, the opening of the dishes each facing outward.

This is advantageous for the stability of the way the cable or cable set is held.

No significant limits are imposed on the type of stable connection of the new cover profile strip in the installation-ready, three dimensional form with the cable holders for routing the cable. Thus, all type of installation that require the lowest possible outlay are possible, especially those such as spring snap-on, latch, or clip connections.

Especially preferred within the context of the present invention is a snap or latch connection of this kind that is arranged at the longitudinal centre between the cable cover profile strip and the cable holders.

In order to secure the cable holders to the walls, ceilings or the like of underground structures, in particular of a sewer system, a central screw-in connection has been shown to be less labour intensive and at the same time perfectly adequate for the long-term stability of the holders.

Rapid and stable fixing of the cover strip ends at those places where they abut against each other and which ensures that the snap connections between the cable cover profile strip and the cable holders will not become loose, can be achieved with slots, which do not demand precise positioning of the attachment screws for the joint cover plates that bridge the butt connections, said slots being intended for the introduction of self-tapping screws that pass through the aforesaid joint cover plates and are anchored in the sides of said slots on both sides of the central attachment of the cable holder on the wall, ceiling, or the like.

It is also an advantage the cable holder has eyelets, tabs, hooks, openings, or the like for anchoring the cable clips for fixing the cable.

Not least, it is an advantage if, as in claim 28, there is on the cable holder a type of indicator for the point where the middle or central holding screw for attaching the cable holder to the wall is located, so that the two slots for anchoring the screw for attaching the joint cover plates at the butt joints between adjacent cable cover strip profiles, which are arranged on the right and on the left of the same, are accessible without any problem and without disturbing the central attachment screw.

Finally, an additional objective of the present invention is a new method for forming the cover of an installation and cover device for cables 6 or cable sets for telephone systems, data links, electrical power, or the like, in particular glass fiber or fiber optics cables or cable sets that are to be installed along walls, partitions, ceilings, or the like, preferably of sewer systems, with cable holders 5 that are spaced apart along said walls, partitions, ceilings, or the like, and a cover 10 that can be secured on the same and which encloses the cable 6 or cable set, the particular features of which have been described in detail heretofore.

This method is essentially characterized in that the three cover strips, namely the front cover strip and the two side cover strips, which are each wound up on to separate winding bodies such as drums, spools, rolls, rollers, or the like, in particular for purposes of storage or transportation, after having been brought to the location at which they are to be installed or laid are wound off their respective winding bodies simultaneously; and in that, essentially in the way in which a toothless, pseudo-Zip fastener is closed, the side cover strips are preferably assembled or combined simultaneously, by pressure assisted introduction of their hinge heads through the slots of the two hinge grooves of the front cover strip, said slots having been widened elastically as a result of the pressure assembled to the cover profile strip, preferably in its prepared state for the attachment as a cover on the cable holders with the side cover strips folded away from the front cover strip.

The present invention will be described in greater detail below on the basis of the drawings appended hereto. The drawings show the following:

BRIEF DESCRIPTION OF THE DRAWINGS

FIG. 1: A cross section through the cable holder and cover device according to the present invention, with a cable holder and a continuous cover strip arranged thereon, as a first embodiment;

FIG. 2: A cross section through the profile strip as in FIG. 1, in an embodiment with a hinge between the front cover strip and the two side cover strips;

FIG. 5: A second embodiment of the coilable cable cover profile strip according to the present invention, with a simple folding joint between the side and front cover strips that make up said cable cover profile strip;

DESCRIPTION OF THE PREFERRED EMBODIMENTS

Figure 3:
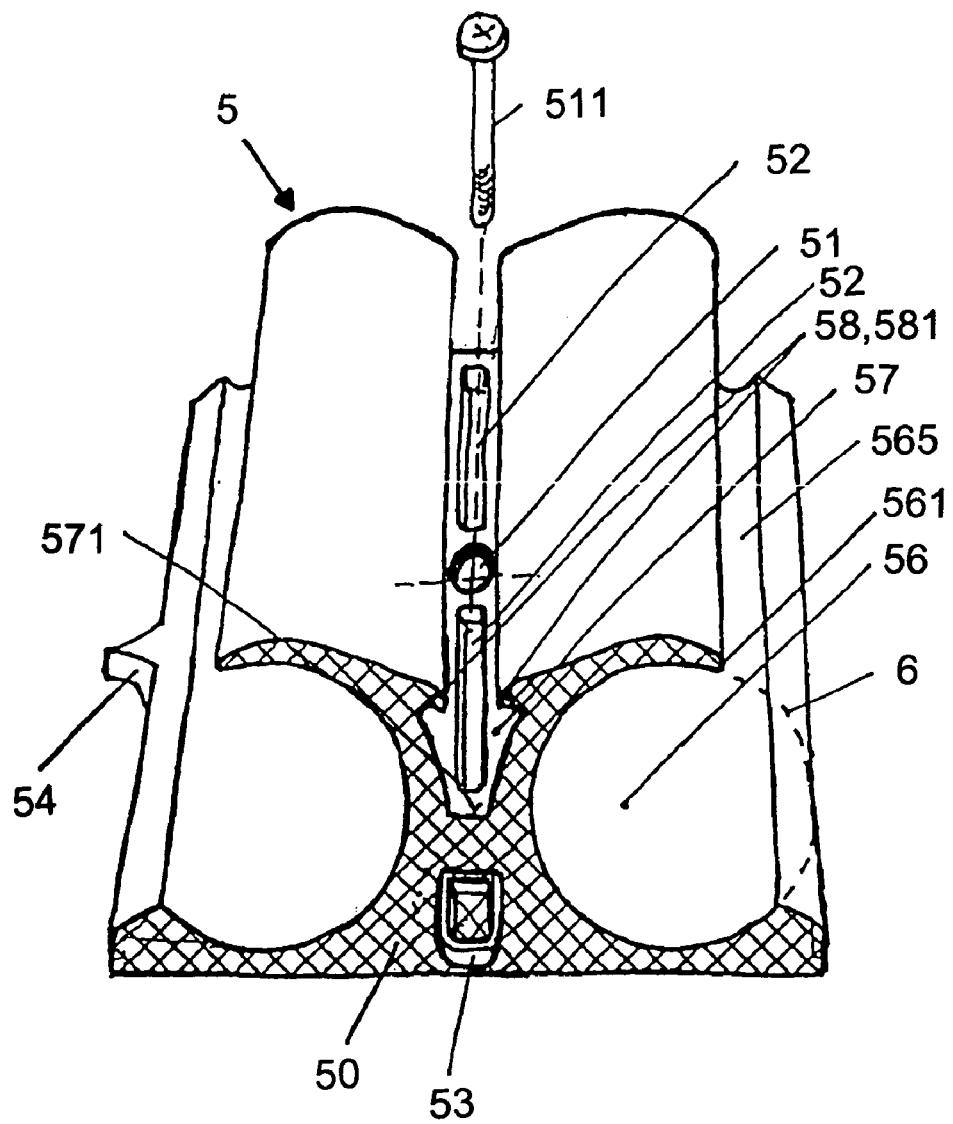
FIG. 3: An oblique view of a cable holder according to the present invention, as viewed from above.

The sectional view at FIG. 1 shows a cable installation and cover device 100 according to the present invention; this has a cable holder 6 with a base console 50 and two cable-holder dishes 56 that are arranged in a double-C shape, in which the outline of a cable 6 with, for example, optical fibers 61, is indicated by thin lines. The cable cover 10 according to the present invention, which is described in greater detail in FIG. 2, comprises a cable cover profile strip 1 with a front cover strip 2 and two side cover strips 3 that are each hinged to the front cover strip 2 through hinge-type connections 23 along their edges. The cable cover profile strip 1 is fixed by way of a hook-in or snap connection 28–58 with hook or snap tabs 281 to the front cover strip by corresponding hook-in or snap latches 581 of the cable holder 5 that work in conjunction with the tabs 281.

A stiffening rib 31 extends inwards, facing towards the cable holder 5, from each of the side cover strips 3' that cover the cable 6 in the cover and installation configuration (AM), and it is shown how, by means of this rib 31, the two cables 6 are gripped from behind, which is an additional factor for stabilizing the attachment of the cables. This stabilizing effect is enhanced by a pivot limit the permits only a maximum angle of pivot α in the hinge connection 23, which makes it necessary that the side cover strips 3 bend—albeit slightly—whereby the two stiffening ribs 31 are pressed with a certain amount of elastic initial tension against the cable 6, at the point where its cross-sectional curvature grows less towards the cable-holder base console 50.

Also shown is a V-shaped slot 57 between the backs of the two cable dishes 56, which has on both of its two upper edges the previously and briefly discussed hook-in or snap-in latches 581, and from the bottom of which an attachment screw 511 or the like passes through the central mounting hole 51 in the cable-holder base console 50.

The edges 561, 562 of the opening 565 of the C-cross section cable dishes 56 are spaced apart at a distance that is somewhat less than the inside diameter ds of the cable dish 56 so that when the cable 6 with a corresponding diameter is inserted—as shown in FIG. 1—an elastic broadening of the C opening 565 of the cable dish 56 is needed in order to install the cable 6 in the cable dish 56, which is then fixed in position by its edges 561, 562 returning to their original position.

What can also be seen is that a flat-bottomed groove 2 runs down the middle of the front cover strip 2; the function of this groove will be described in greater detail in connection with FIG. 2; in addition, there is a projection on the base console that is an indicator 54, the function of which will be described in greater detail in connection with FIG. 3.

FIG. 2, which uses the same reference numbers, is a cross section through the new coilable cable cover profile strip 1 in the state when it is wound onto a winding body prior to being installed on site in a sewer or the like. In this drawing, the two side cover strips 3 are folded inward to the front cover strip 2; the drawing also shows the positional and connection conditions of the individual parts of the hinge connection 23 that work in conjunction with one another.

These hinge connections 23 between the front cover strip 2 and the two side cover strips 3 are each formed by a hinge groove 25 that extends along the side edges 201 of the front cover strip and is essentially of C-cross section, and in which the hinge head 35, which resembles the head of a nail, of each side cover strip 3 is held so as to be able to slide and rotate. In the "folded position" LT that is shown in the drawing, which is used for transportation and storage, the hinge head 35 of each side cover strip 3 is at the end point of this sliding and rotational movement within the hinge groove 25.

In the position LT that is shown, a neck or shaft 351, which is curved almost at a right angle downwards or outwards, extends from the hinge head 35; this passes through the outward-facing slot 251 in the hinge groove 25; its stiffening rib 31 extends almost at a right angle to touch the side cover strip 3. The unattached edges 301 of the side cover strips 3 are so positioned that when the side cover strip is pivoted away from the front cover strip 2 they encounter the resistance of the hook-in or snap-in tabs 281 of the front cover strip 2 that are in the way. This effectively prevents unintentional or independent folding of the side cover strips 3 and thereby prevents any problems with coiling up the new cable cover profile strip 1.

If the side cover strips 3 are pivoted out into the installation and cover position MA as in FIG. 1 in order to attach the new cover 1 to the installed part, the resistance of the hook-in tabs 281, discussed heretofore, can be overcome by slightly increasing the amount of force that is applied when pivoting the side cover strips 3, when the tabs 281 recede somewhat and thereby permit this folding action.

Reference should now be made to FIG. 1, which shows the new cable cover profile strip 1 in the installed state MA, with the hook-in connection already completed and the side cover strips 3 sprung outward. In this position the nail head-like hinge head 35 is completely inside the hinge groove 25, between the two edges of its slot 251. After it emerges from the groove-slot opening 251, the curvature 3511 of the shaft 351 that is angled toward the outside matches the curvature 2511 of the area of the outside surface of the hinge groove 25 that is adjacent to the outside of the slot 251.

The side cover strips 3 are under some tension and their stiffening ribs 31 press against the cables 6 where their outside contour has in each instance already exceeded the maximum.

The perspective view at FIG. 3 shows—using the same reference numbers—the cable holder 5 with the double-C shaped cable dishes 56, the matching snap-in latches 581 and the middle installation opening 51. Next to this opening 51 are the elongated slots 52 that extend along the bottom 571 of the cut 57 and are made in the cable holder base console 50; these slots 52 are used to anchor the screws that cut into their sides to fix the ends of adjacent cable cover profile strips 1 in the vicinity of their butt joints.

In the same way, at the longitudinal centre, an eyelet 52 protrudes forward and (not visible herein) backward; this is used to hold cable binders for fixing the cables 6. At the side (in FIG. 3, on one side only), a kind of pointer or arrowhead 54 extends outward from the basis console 50; this pointer indicates the position of the middle attachment opening 51 for the attachment screw 511, which passes through the basis console 51. This indicator is meant to ensure that the two self-tapping screws referred to heretofore, which fix the abutting ends of two adjacent cable cover profile strips, can be inserted without error at a distance from this middle attachment point 51 into the above discussed anchoring slot 52 to the right and to the left of this central opening 51 of the cable holder 5.

A notch, paint, luminous paint, or the like can be used instead of the indicator 54.

Figure 4:
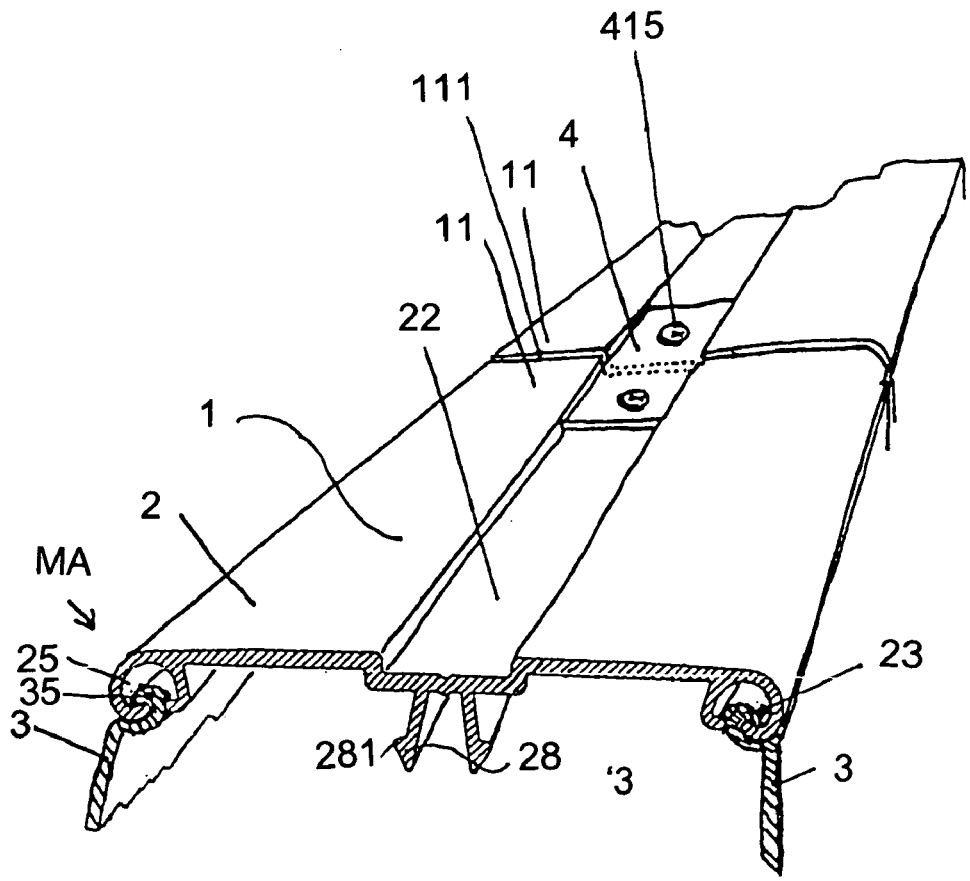
FIG. 4: An oblique view of a butt joint on a cable holder, between the two ends of two adjacent cable cover profile strips according to the present invention.

FIG. 4 shows—using the same reference numbers—a butt joint 111 between the two ends 11 of two adjacent cable cover profile strips 1 and how this/these are bridged by joint cover plates 4 that are preferably of sheet metal, these plates 4 being held in their turn by screws 415 arranged to the right and left of the joint. These screws are driven through the plates 4 and into the slots 52 in the basis console of the cable holder 6 by their self-tapping action (see FIG. 3).

FIG. 5 shows—using the same reference numbers—another, particularly simple, embodiment of the cable cover profile strip 1 according to the present invention; this is formed in one piece and can be manufactured by an appropriate single-pass extrusion process, the two side cover strips being connected to the front cover strip by way of an easy bending, flexible, folding joint 23' instead of by way of a hinge.

Figure 6:
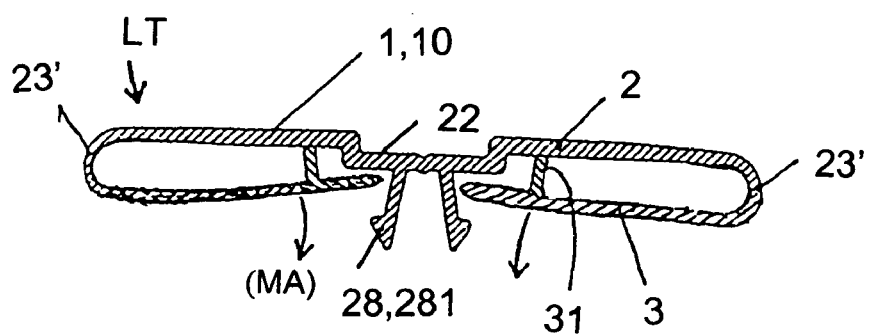
FIG. 6: A third form of a cable cover profile strip with a simply constructed hinge.

Using the same reference numbers, FIG. 6 is a partial view of a cross section through a second embodiment of the new cable cover profile strip 1 with a very simple hinge connection 23, that is constructed on the principle of a human joint and has a hinge head 35 that is in the form of a roller that rotates within the hinge groove 25 and essentially fills said groove 25.

The invention claimed is:

1. Installation and cover device for mounting cables to structural walls, comprising:

cable holders spaced apart on a structural wall;

a cable cover configured to be attached to said cable holders and substantially enclosing the cable;

said cable cover having a front cover strip and side cover strips extending from lateral edges of said front cover strip, said front cover strip and said side cover strips together forming a cable cover profile strip configured to be wound or coiled onto a winding body and unwound from the winding body for installation thereof;

said side cover strips and said front cover strip being connected through a hinged connection;

said side cover strips, in a folded state when said cover is rolled up for storage and transportation, having said side cover strips folded towards each other and extending substantially parallel to said cover strip;

said side cover strips, in an installation and covering position in which said cover is in an unfolded state for attachment to said cable holders, each of said side cover strips being folded or pivoted away from said front cover strip transversely to said front cover strip.

2. The device according to claim 1, wherein said side cover strips are connected to said front cover strip through the hinged connection.

3. The device according to claim 1, which comprises a hinge structure connecting each of said side cover strips to said front cover strip.

4. The device according to claim 1, wherein:

said cable cover is formed with the hinged connection between said front cover strip and said side cover strips, each of said front and side cover strips is wound separately onto respective ones of the winding body for storage and transportation; and prior to or during installation of said cover and assembly of said cable cover profile strip into the installation and covering position, said front and side cover strips are combined to form said assembly of said front cover strip and said side cover strips flexibly connected to form said cable cover.

5. The device according to claim 1, wherein said front and side cover strips forming said cover profile strip are manufactured of a plastic or polymer material that is substantially flexible for coiling in a longitudinal direction and that is substantially resiliently elasto-flexible in a transverse direction.

6. The device according to claim 5, wherein said plastic or polymer material has a modulus of elasticity of between 2950 and 3050 N/mm$^2$.

7. The device according to claim 1, wherein said front and side cover strips forming said cover profile strip are manufactured from a hard polyvinyl chloride plastic.

8. The device according to claim 1, which comprises hinge connections between said front cover strip and each of said side cover strips, said hinge connections being formed with an undercut, an open hinge groove, and a hinge head rotatable and slideable in the hinge groove.

9. The device according to claim 8, wherein said hinge groove are formed on said front cover strip and said hinge head are formed on said side cover strips.

10. The device according to claim 9, wherein, when said cable cover is installed, said hinge groove is oriented towards said cable holders and the cables held therein.

11. The device according to claim 8, wherein said hinge groove of said front cover strip has a cross-sectional shape substantially of an upper-case C.

12. The device according to claim 8, wherein said hinge head of said side cover strips are sliding and rotating hinge rollers with surfaces thereof on innermost sides of said hinge groove of said front cover strip.

13. The device according to claim 8, wherein said hinge head slidably and rotatably disposed within said hinge grooves have a cross section resembling a nail head with an upper side curved convexly to match a concave curvature of an inner surface of said hinge groove.

14. The device according to claim 13, wherein the concave curvature of said hinge groove of said front cover strip and a convex curvature of said hinge head of said side cover strips are substantially circular curvatures that match one another.

15. The device according to claim 13, wherein an outwardly curving neck or shaft extends away from said hinge head of each of said side cover strips, said neck or shaft passing through a slot formed in said hinge groove of said front cover strip and angling downward into said side cover strips.

16. The device according to claim 15, wherein a concave side of the curvature of said shaft is formed to match a convex curvature of an outermost side of said hinge groove of an immediately adjoining area of an outermost edge of said slot of said hinge groove of said front cover strip.

17. The device according to claim 15, wherein said slot of said hinge groove of said front cover strip and said hinge head of said side cover strips are configured to cooperate to limit an outward pivoting and folding movement of said side cover strips up to a predetermined maximum pivot angle.

18. The device according to claim 17, wherein said maximum pivot angle is approximately 90°.

19. The device according to claim 17, wherein, when said side cover strip are pivoted outwardly away from said front cover strip in excess of the maximum pivot angle, said side cover strips become insertable or supported substantially flexibly and can optionally be snapped or latched to engage in an undercut notch formed in said cable holders.

20. The device according to claim 17, wherein, when said side cover strip are pivoted outwardly away from said front cover strip in excess of the maximum pivot angle, said side cover strip are insertable and mountable at a downward curvature of a wall-facing surface of the cable.

21. The device according to claim 1, wherein each of said side cover strips of said cable cover profile strip has a stiffening rib on an innermost side thereof extending along a longitudinal dimension of said side cover strips.

22. The device according to claim 21, wherein said stiffening rib is mountable or supportable in a snap-in recess or an undercut notch formed in said cable holders.

23. The device according to claim 21, wherein said stiffening rib is supportable at a side of the cable facing the structure wall.

24. The device according to claim 1, wherein said front cover strip of said cover profile strip is formed with a flat groove.

25. The device according to claim 24, wherein said flat groove is formed at a mid-point of said front cover strip.

26. The device according to claim 24, wherein said flat groove is configured to accommodate and position a joint cover and holding plate bridging a butt joint between ends of adjacent cover profile strips and said cover and holding plate is held in place by attachment elements to be anchored on or in said cable holder.

27. The device according to claim 26, wherein said attachment elements are self-tapping screws to be disposed on both sides of said butt joint, and said holding plate is formed of sheet metal.

28. The device according to claim 1, wherein said front cover strip, on back side facing said cable holders upon mounting, has a flexible, resilient snap-in or lock-in profile to be snapped or locked into a corresponding snap-in or lock-in profile formed in said cable holders.

29. The device according to claim 28, wherein each of said snap-in or lock-in profile extends longitudinally along a center of said cable cover.

30. The device according to claim 1, wherein said cable holders are formed with two mutually symmetric trough-like cable-holder dishes having a C-shaped cross section, and openings of said dishes each facing outward.

31. The device according to claim 30, wherein said cable holders are formed with an outwardly open cut between said cable-holder dishes, and a section extending from said cut to a free edge of said cable-holder dish is configured to be resilient to a limited extent.

32. The device according to claim 31, which comprises matching snap-in or lock-in latches formed within said cut between said cable-holder dishes, said snap-in or lock-in latches functioning as corresponding snap-in or lock-in latches in conjunction with snap-in or lock-in tabs of said cable cover profile strip.

33. The device according to claim 31, wherein bottom of said cut between said cable-holder dishes has an installation opening formed therein passing through a basis console of one of said cableholders for securing said cable holder to the structure wall.

34. The device according to claim 33, wherein said basis console extends along a longitudinal center of said cable cover, and said installation opening is formed to mount said cable cover on a vertical wall, a horizontal wall, a sewer wall, a building wall, or a ceiling.

35. The device according to claim 33, wherein said basis console of said cable holders, on both sides of said installation opening and substantially extending out from a bottom of said cut between said cable-holder dishes, is formed with a slot passing through said basis console for anchor screws fixing the abutting ends of two cable cover strips by way of joint cover and installation plates.

36. The device according to claim 30, wherein said cable holders are formed with at least one eyelet, a pin, or a hook for fixing a cable tie in said cable-holder dishes.

37. The device according to claim 36, wherein each of said cables is disposed in a cable run having a diameter smaller than a diameter of said cable-holder dishes.

38. The device according to claim 33, wherein said basis console of said cable holders has an indicator configured to indicate a location of said installation opening, said indicator being selected from the group consisting of a notch, a painted marker, a luminous paint marker, and a pointer protruding form said basis console.

39. The device according to claim 1, wherein said cable holders are formed of plastic.

40. The device according to claim 39, wherein said cable holders are formed of ABS (acrylonatrilebutadiene styrene).

41. The device according to claim 1, wherein said cable holders are formed of glass fiber-reinforced ABS.

42. The device according to claim 1 configured to mount cable strands of telephone lines, data-transmission lines, electrical cables, glass fiber or fiber optics cables, and cable sets to be laid along walls, partitions, ceilings, in underground pipes, arches, tunnels, sewers, or shafts.

43. A method for forming a cover of an installation and cover device for cables in accordance with claim 1, where the cables are to be mounted in the cable holders spaced apart on the structural walls and the cover is attached on or to the cable holders and substantially encloses the cables, the method which comprises:

provinding the front cover strip and the side cover strips separately wound on the winding body in a state for storage and transportation;

at a location at which the cover is to be laid or installed, commonly unwinding the front cover strip and the side cover strips from the winding body;

merging edge structures of the side cover strips with the front cover strip, and pressing hinge heads formed on the side cover strips into hinge grooves of the front cover strip, and widening a slot forming an entrance into the hinge grooves elastically to assemble the cover profile strip for attachment to the cable holders with the side cover strips folded away from the front cover strip.

44. The method according to claim 43, wherein the merging step comprises connecting the side cover strips to the front cover strip in a manner of a toothless zipper.

45. The method according to claim 43, which comprises laying cable sets for telephone lines, data-transmission lines, electrical cables, glass fiber or fiber optics cables, or cable sets along walls, partitions, ceilings, underground pipes, arches, tunnels, sewers, or shafts.

* * * * *